(12) United States Patent
Yasui et al.

(10) Patent No.: US 7,265,457 B2
(45) Date of Patent: Sep. 4, 2007

(54) POWER CONTROL APPARATUS

(75) Inventors: Takahiro Yasui, Tokyo (JP); Hiroaki Takahashi, Tokyo (JP); Hiroshi Tsutsumi, Tokyo (JP); Shoji Hara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 95 days.

(21) Appl. No.: 10/891,856

(22) Filed: Jul. 15, 2004

(65) Prior Publication Data

US 2004/0263347 A1     Dec. 30, 2004

Related U.S. Application Data

(63) Continuation of application No. PCT/JP03/00795, filed on Jan. 28, 2003.

(30) Foreign Application Priority Data

Feb. 8, 2002  (JP)  ............................. 2002-032566

(51) Int. Cl.
*H02H 7/18*  (2006.01)
*H02J 1/08*  (2006.01)

(52) U.S. Cl. .................................................. 307/10.7

(58) Field of Classification Search ................ 307/10.7
See application file for complete search history.

(56) References Cited

U.S. PATENT DOCUMENTS

| 5,473,201 A | * | 12/1995 | Gantenbein et al. | ........ 307/10.6 |
| 6,144,110 A | * | 11/2000 | Matsuda et al. | ........... 307/10.1 |
| 6,441,556 B1 | * | 8/2002 | Scruggs et al. | ............. 315/127 |
| 6,582,261 B2 | * | 6/2003 | Kanno | ......................... 440/84 |

FOREIGN PATENT DOCUMENTS

| JP | 62-19046 | 2/1987 |
| JP | 64-005332 A | 1/1989 |
| JP | 06-119088 A | 4/1994 |
| JP | 7-274390 | 10/1995 |
| JP | 07-274390 A | 10/1995 |
| JP | 10-271698 | 10/1998 |

* cited by examiner

*Primary Examiner*—Michael Sherry
*Assistant Examiner*—Hal I. Kaplan
(74) *Attorney, Agent, or Firm*—Cohen Pontani Lieberman & Pavane LLP

(57) ABSTRACT

A power control apparatus includes a latch relay interposed between a power source and electronic control units, and a control section changed into an operative state when connected to the power source upon closure of a first switch, and supplies a drive current to a reset coil of the latch relay, thereby disconnecting power supply from the power source to the control units, when second switches are operated in a predetermined operation pattern.

4 Claims, 2 Drawing Sheets

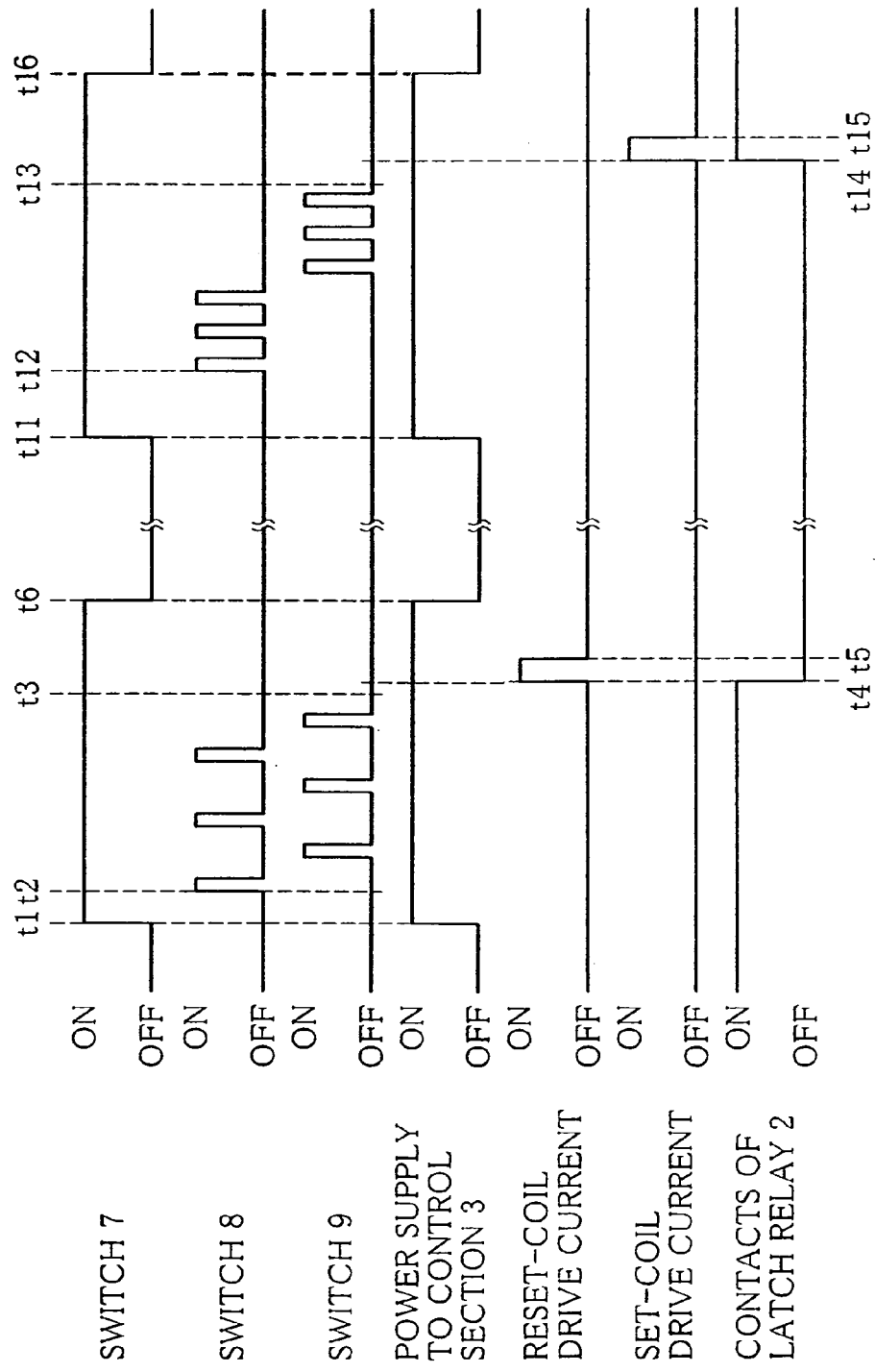

POWER CONTROL APPARATUS

CROSS-REFERENCE TO A RELATED APPLICATION

This is a continuation of Application PCT/JP2003/000795, filed on Jan. 28, 2003, the entire contents of which are hereby incorporated by reference.

BACKGROUND OF THE INVENTION

1. Technical Field

The present invention relates to a power control apparatus for controlling power supply from a power source to one or more electronic control units.

2. Background Art

An electronic control system is typically provided with electronic control units that are connected with one another through a communication line. Each electronic control unit includes a processing unit in many cases. Each electronic control unit serves to control the drive of an actuator connected thereto in accordance with operation states of operation switches that are connected to own and/or another control unit.

With recent trend of multi-functionalization of an electronic control system, a remarkable increase has been noted in the number of operation switches connected to the control system. Thus, the multi-functional control system is required to quickly detect operation states of a large number of operation switches for control of actuators. So each electronic control unit of the system carries out processing for the detection of operation states at a high clock rate, resulting in increased power consumption.

To suppress the increased power consumption, various countermeasures have been taken in the multi-functional control system. For instance, during the time where no operation switches are operated so that no actuator control is necessary, the electronic control units of the system are changed from an ordinary mode into a wait mode in which processing units of the control units operate at low clock rates or into a halt mode in which the clock remains stopped.

In order to allow electronic control units to change into the halt mode, however, each control unit requires an additional special circuit for measuring whether control unit may change from the ordinary mode or the wait mode into the halt mode or not, resulting in a high-priced electronic control system.

Furthermore, power consumption in the electronic control unit cannot be made zero even in the halt mode. This is because, even if the control system is in an inoperative state as a result of changing into the halt mode, the control system must be restored to an operative state when any one of operation switches is operated. Therefore, the electronic control unit is required to detect pieces of operation information on the operation switches even in the halt mode, yielding a slight power consumption for the detection of information.

As for an electronic control system for passenger car, electronic control units of the system may change into the halt mode for reduction in power consumption, e.g., in a case where a car is parked for a long time or transported to a remote place. However, the electronic control units are arranged to detect, e.g., an operation of an engine start switch in the halt mode, thus yielding a slight power consumption. A slight but continual power supply from an automotive battery to the electronic control units may cause an overdischarge of the battery.

To obviate battery overdischarge during the transportation, a power wire linking the battery and the electronic control units may be detached by manual work from the battery or the control units. However, this requires much labor. In addition, electrification failures and short-circuit failures may be caused during the manual work for wire detachment.

SUMMARY OF THE INVENTION

An object of the present invention is to provide a power control apparatus which is useable in safety, low in cost, capable of changing one or more electronic control units into an inoperative state without the need of detaching a power wire from a power supply or the control units, capable of reducing power consumption during the time the control units are in the inoperative state, and capable of restoring the electronic control units to an operative state without the need of reconnecting the power wire.

According to the present invention, there is provided a power control apparatus for controlling electric supply from a power source to at least one electronic control unit that detects pieces of operation information on plural switches including a first switch and at least one second switch. The power control apparatus comprises power on-off means connected to the power source through a first power wire and to the at least one electronic control unit through a second power wire, and operable to electrically connect and disconnect the first power wire to and from the second power wire; and a control section to get operative when the first switch is closed so that electric power is supplied from the power source to the control section, the control section serving, in an operative state, to control connecting/disconnecting operations of the power on-off means when the one or more second switches are operated in a predetermined operation pattern.

In the power control apparatus of this invention, the control section gets operative when supplied with electric power from the power source upon closure of the first switch. The control section in the operative state controls a connecting/disconnecting operation of the power on-off means when the one or more second switches are operated in a predetermined operation pattern, whereby the connection between the power source and the control unit through the first and second power wires is established or released. Thus, by operating the second switch in the predetermined operation pattern with the first switch closed, the connection between the first and second power wires through the power on-off means is released to thereby disconnect the power supply from the power source to the electronic control unit, thus making the control unit inoperative. As a result, power consumption in the electronic control unit can be reduced to zero.

Thereafter, when the first switch is opened, electric power supply from the power source to the control section of the power control apparatus is disconnected, so that power consumption in the power control apparatus is reduced to zero. In a case where the power source is constituted by a battery, therefore, the overdischarge of the battery can be prevented by keeping the first switch open after the control unit gets inoperative.

In addition, by operating the second switch in a predetermined operation pattern after the first switch is turned on, the connection between the first and second power wires can be established. As a result, power supply from the power source to the electronic control unit through the first and second power wires is started, whereby the control unit can be restored from the inoperative state to the operative state.

BRIEF DESCRIPTION OF THE DRAWINGS

FIG. 2 is a timing chart showing an example of the behaviors of each component of the power control apparatus in responding to operations of switches shown in FIG. 1.

DETAILED DESCRIPTION

Figure 1:
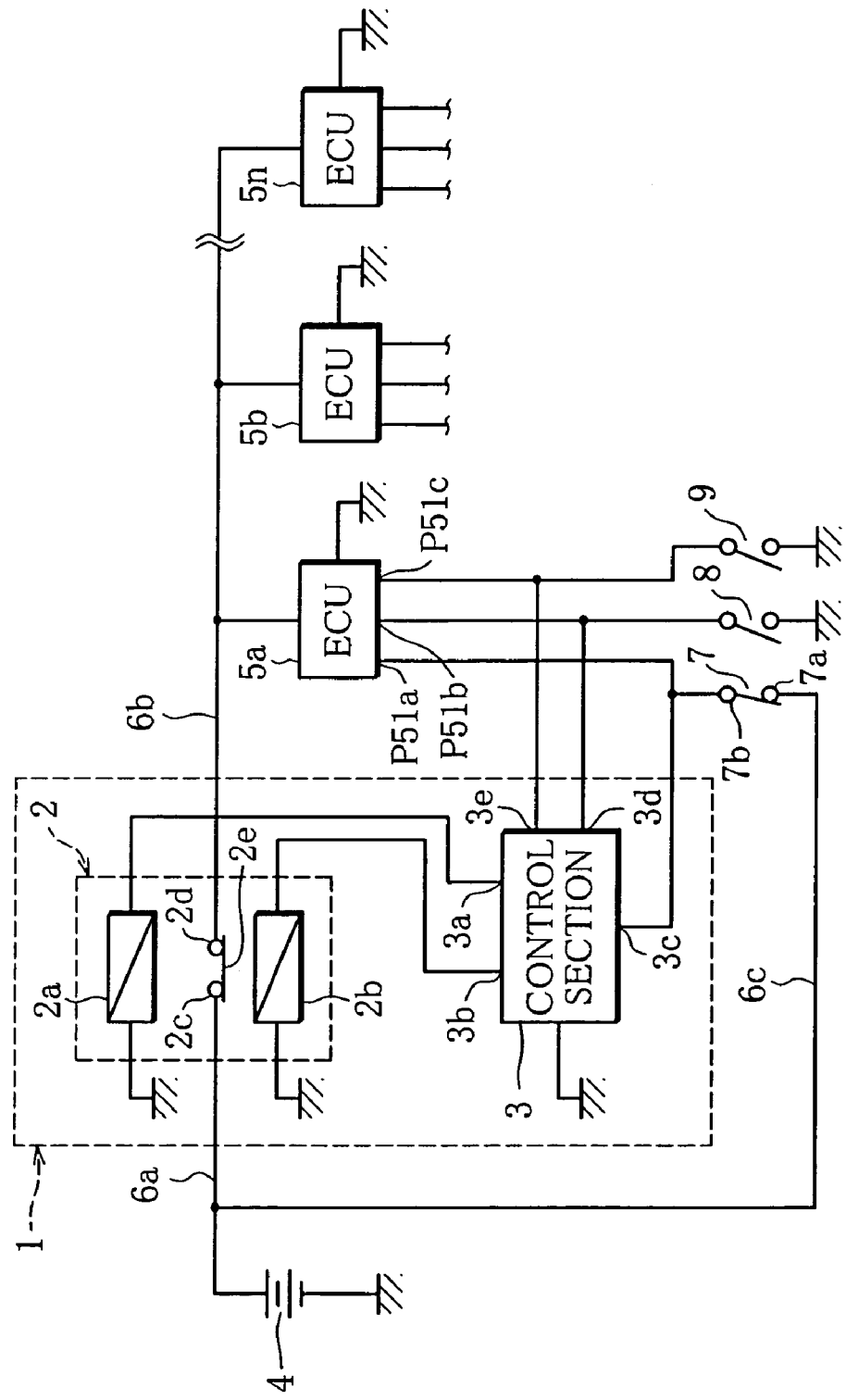
FIG. 1 is a schematic circuit diagram showing an electronic control system equipped with a power control apparatus according to an embodiment of this invention.

With reference to the appended drawings, a power control apparatus according to an embodiment of this invention will be explained.

This power control apparatus serves to control the supply of electric power from a power source to one or more electronic control units, and is mounted, for instance, on a passenger car.

Referring to FIG. 1, the automotive power control apparatus 1 of this embodiment is connected, on the one hand, to a battery 4 serving as a power source through a first power wire 6a, and on the other hand, is connected to electronic control units (hereinafter refer to ECUs) 5a-5n through a second power wire 6b. The ECUs 5a-5n are set up to control vehicle-mounted units (hereinafter referred to as loading units), not shown.

The power control apparatus 1 comprises a latch relay 2, serving as power on-off means for electrically connecting or disconnecting between the first and second power wires 6a, 6b; and a control section 3 for controlling on-off behaviors of the latch relay 2. The latch relay 2 can be constructed variously as conventionally known. In the following, an example of the construction of the latch relay 2 will be explained in brief.

For instance, the latch relay 2 comprises a stationary plate (not shown) equipping two stationary contacts 2c, 2d, and a non-magnetic tubular member (not shown) fixed to the stationary plate with penetrating the stationary plate. The stationary contact 2c is named first stationary contact, and the stationary contact 2d is named second stationary contact. The tubular member has a base portion of a permanent magnet (not shown) movable inside the distal end portion thereof. Outside the non-magnetic tubular member, a movable plate (not shown) which has the contact 2e is equipped at one end with the permanent magnet. The tubular member has a base end portion in which a magnetic material member (not shown) is disposed and around which a set coil 2a and a reset coil 2b are disposed.

In the latch relay 2 constituted as mentioned above, when the set coil 2a is supplied with electric power, the permanent magnet and the movable plate move toward the magnetic material member so that the movable contact 2e makes contact with the stationary contacts 2c, 2d, whereby the stationary contacts 2c, 2d are electrically connected with each other through the movable contact 2e. The connected state (i.e., contact closed state of the latch relay 2) is held even after the power supply to the set coil 2a is stopped. On the other hand, when the reset coil 2b is supplied with electric power, the permanent magnet and the movable plate move away from the magnetic material member, so that the electrical connection between the stationary contacts 2c, 2d through the movable contact 2e is released. The disconnected state (i.e., contact open state of the latch relay 2) is held even after power supply to the reset coil 2b is stopped.

The first stationary contact 2c of the latch relay 2 is connected to the battery 4 through the first power wire 6a, whereas the second stationary contact 2d is connected to the ECUs 5a-5n through the second power wire 6b. Further, the set coil 2a and the reset coil 2b are connected to a set-coil drive terminal 3a and a reset-coil drive terminal 3b of the control section 3, respectively.

When a drive current supplied from the set-coil drive terminal 3a flows through the set coil 2a to the ground, the latch relay 2 is changed into the contact closed state, allowing electric power to be supplied from the battery 4 to the ECUs 5a-5n. On the other hand, when a drive current from the reset-coil drive terminal 3b flows through the reset coil 2b to the ground, the latch relay 2 is changed into the contact open state, disconnecting the power supply from the battery 4 to the ECUs 5a-5n.

When supplied with electric power from the battery 4, each of ECUs 5a-5n gets operative and starts to detect pieces of operation information of switches concerned, and transmits the pieces of operation information to loading units, whereby the loading units are controlled in response to operations of the switches.

As for ECU 5a, pieces of operation information of the switches 7-9 are utilized as pieces of information for operating accessories, a door locking device, and door mirror adjuster, respectively, for instance.

A first stationary contact 7a of the switch 7 is connected through a third power wire 6c to the battery 4, whereas a second stationary contact 7b is connected through a fourth power wire to a first control input terminal P51a of the ECU 5a. First and second stationary contacts of the switch 8 are connected through signal lines to a second control input terminal P51b and the ground, respectively. First and second stationary contacts of the switch 9 are connected to a third control input terminal P51c and the ground, respectively.

The ECU 5a detects, as information for operation of supplying electric power to the accessories, a battery voltage applied to the first control input terminal P51a in response to an on-operation of the switch 7, whereas it detects, as information for operation of disconnecting the power supply to the accessories, an open state of the first control input terminal P51a in response to an off-operation of the switch 7. Each of the second and third control input terminals P51b, P51c has the ground potential in response to an on-operation of a corresponding one of the switches 8, 9, and changes into an open state in response to an off-operation of the corresponding switch. The ECU 5a detects information for operation of each of the door locking device and the door mirror adjuster depending on whether each of the second and third control input terminals is at the ground potential or in the open state.

The power control apparatus 1 of this embodiment is featured in that it controls the power supply from the battery 4 to the ECUs 5a-5n in response to on/off operations of switches that have heretofore been utilized only for the detection of pieces of information for operation of vehicle-mounted devices.

In the following, the power control apparatus 1 will be further explained by taking as an example the switches 7-9 connected to the ECU 5a.

The control section 3 of the power control apparatus 1, having a power input terminal 3c connected to the second stationary contact 7b of the switch 7, gets operative when supplied with electric power in response to the on-operation of the switch 7, whereas it stops operating when the power input terminal 3c changes into an open state in response to the off-operation of the switch 7 so that the power supply to the control section 3 is stopped. In this manner, the power control apparatus 1 can also utilize the switch 7 for control of power supply from the battery 4 to the control section 3, though the switch 7 has heretofore been utilized only for the detection of information for operation of accessories.

Further, the control section 3 has first and second control input terminals 3d, 3e to which the switches 8, 9 are respectively connected. The first control input terminal 3d is at the ground potential when the switch 8 is turned on, whereas it becomes an open state when the switch 8 is turned off. Similarly, the second control input terminal 3e is at the ground potential and in an open state when the switch 9 is turned on and off, respectively. As mentioned later, the power control apparatus 1 can also utilize the switches 8, 9 for control of power supply to the ECUs 5a-5n, though the switches have heretofore been utilized only for the detection of pieces of information for operation of the door locking device and the door mirror adjuster.

Specifically, the power control apparatus 1 disconnects power supply when the switches 8, 9 are operated in a first operation pattern, mentioned later, after the switch 7 is turned on while electric power is being supplied from the battery 4 to the ECUs 5a-5n. On the other hand, the power control apparatus 1 starts power supply from the battery 4 to the ECUs 5a-5n, when the switches 8, 9 are operated in a second operation pattern, mentioned later, after the on-operation of the switch 7 while the power supply to the ECUs is being stopped.

More specifically, at a time point of t1 shown in FIG. 2, the control section 3 becomes operative when the switch 7 is turned on by an operator and electric power is supplied from the battery 4 to the control section 3, whereby the control section 3 is enabled to detect pieces of operation information on the switches 8, 9 through the control input terminals 3d, 3e. Thereafter, when the switches 8, 9 are operated in accordance with a predetermined first operation pattern, the control section 3 changes the latch relay 2 into a contact open state.

For instance, the control section 3 detects that the switches 8, 9 are operated in the first operation pattern, when the on-off operation of the switch 8 and the on-off operation of the switch 9 are alternately carried out three times each within a predetermined time period (from a time point of t2 to a time point t3). In other words, the control section 3 detects the aforementioned series of switch operations as a power-off operation.

When detecting the power-off operation, the control section 3 supplies a drive current from the reset-coil drive terminal 3b to the reset coil 2b of the latch relay 2 during the time period from a point of t4 to a point of t5. As a result, the latch relay 2 is changed into a contact-open state at the time point of t4, whereby power supply from the battery 4 to the ECUs 5a-5n is disconnected. Thereafter, when the switch 7 is turned off by the operator at a time point of t6, power supply to the control section 3 is stopped. Thus, electrical connection between the battery 4 and the ECUs 5a-5n and between the battery 4 and the control section 3 is released, so that the battery 4 stops supplying power to the control section 3 and the ECUs 5a-5n, whereby the battery 4 is prevented from discharging.

Under a condition that the latch relay 2 is in a contact-open state, when the switch 7 is turned on at a time point of t11, the control section 3 is supplied with electric power from the battery 4 and gets operative, whereby the control section 3 is enabled to detect pieces of operation information on the switches 8, 9 through the control input terminals 3d, 3e.

Thereafter, when the switches 8, 9 are operated according to a predetermined second operation pattern, the control section 3 changes the latch relay 2 into a contact-closed state. As shown by way of example in FIG. 2, when the on-off operation of the switch 8 is repeated three times and then the on-off operation of the switch 9 is repeated three times within the predetermined time period from a time point of t12 to a time point of t13, the control section 3 detects that the switches 8, 9 are operated according to the second operation pattern. In other words, the control section 3 detects the just-mentioned series of switch operations as a power-on operation.

When detecting the power-on operation, the control section 3 supplies a drive current from the set-coil drive terminal 3a to the set coil 2a of the latch relay 2 during the time period from a time point t14 to a time point of t15 as shown in FIG. 2, and as a result, the latch relay 2 is changed into a contact-closed state at the time point of t14, thereby supplying electric power to the ECUs 5a-5n.

When the switch 7 is turned off by the operator at a time point of t16, power supply to the control section 5 from the battery 4 is stopped and hence the control section 3 stops operating. However, the contact of the latch relay 2 is held closed so as to keep power supply from the battery 4 to the ECUs 5a-5n, thus keeping each ECU enabled to detect pieces of operation information on the switches concerned.

As mentioned before, whether or not the switches 8, 9 are operated in a predetermined operation pattern is determined by the control section 3. In this respect, the control section 3 can be composed variously. For example, the control section 3 may be composed of a central processing unit. When the control section 3 is in an operative state, the central processing unit executes a monitoring program stored therein beforehand, to monitor pieces of operation information on the switches 8, 9 that are input to the control input terminals 3d, 3e, and supplies a drive current to a corresponding one of the set coil and the reset coil of the latch relay 2 when determining that the switches 8, 9 are operated in a predetermined operation pattern. Alternatively, the control section 3 may be composed of a logic circuit or a programmable logic array (PLA) having both the functions of detecting a switch operation state and of supplying a coil drive current.

In summary, the power control apparatus 1 is capable of allowing and disconnecting power supply from the battery 4 to the ECUs 5a-5n in response to switch operations for loading units such as for example, accessories, door locking device and door mirror adjuster. This makes it possible to prevent the power consumption at the ECUs 5a-5n when the ECUs do not control the loading units, thereby reducing power consumption in the ECUs to zero.

To be noted, the switches 7-9 for operation of accessories, door locking device and door mirror adjuster are ordinarily never operated simultaneously. Thus, by using these switches 7-9 for the power supply control performed by the power control apparatus 1, an erroneous control can be prevented. As long as such a function can be achieved, different switches used to control other loading units may be employed instead of the switches 7-9. Needless to say, the switches used for power supply control performed by the power control apparatus 1 are not limited to two in number, and the switch operation patterns therefor are not limited to those shown in FIG. 2. In other word, one or more switches may be used, and operation patterns of the one or more switches may be set variously.

The controlled object of this invention is not limited to electronic control units of the aforementioned automotive control system, and the present invention is also applicable to an electronic control unit for controlling a loading unit other than vehicle-mounted units or for controlling a loading unit via an LAN circuit. As for the power source, it is not inevitably necessary to use a battery. In other respects, various modifications may be made without departing the scope of this invention.

What is claimed is:

1. A power control apparatus for controlling electric power supplied from a power source to at least one electronic control unit that detects pieces of operation information on plural switches including a first switch and at least one second switch, comprising:

power on-off means connected to the power source through a first power wire and to the at least one electronic control unit through a second power wire, and operable to electrically connect and disconnect the first power wire and the second power wire; and a control section changed into an operative state when the first switch is closed so that electric power is supplied from the power source to the control section, and serving, in the operative state, to control connecting/disconnecting operations of the power on-off means when the at least one second switch is operated in a predetermined operation pattern;

wherein said power on-off means is a latch relay;

wherein said latch relay includes a first stationary contact connected to the power source, a second stationary contact connected to the at least one electronic control unit, a movable contact, a set coil for electrically connecting the first and second stationary contacts through the movable contact, and a reset coil for releasing the electrical connection between the first and second stationary contacts;

wherein said control section includes a set-coil drive terminal connected to the set coil, a reset-coil drive terminal connected to the reset coil, a power input terminal connected to the power source through the first switch, and a control input terminal connected to the at least one second switch; and wherein said control section supplies a drive current from the reset-coil drive terminal to the reset coil when determining that the at least one second switch is operated in a first operation pattern, and supplies a drive current from the set-coil drive terminal to the set coil when determining that the at least one second switch is operated in a second operation pattern, based on operation information on the at least one second switch that is input to the control input terminal.

2. The power control apparatus according to claim 1, wherein said control section actuates said power on-off means so as to carry out the connecting operation for electrically connecting the first power wire with the second power wire, when the at least one second switch is operated in a first operation pattern.

3. The power control apparatus according to claim 1, wherein said control section actuates said power on-off means so as to carry out the disconnecting operation for electrically disconnecting the first power wire from the second power wire, when the at least one second switch is operated in a second operation pattern.

4. The power control apparatus according to claim 1, wherein the at least one second switch comprises third and fourth switches;

said control section detects that the at least one second switch is operated in the first operation pattern when the third and fourth switches are alternately on-off operated a first predetermined number of times each, during a first time period from a time of turning on the first switch; and said control section detects that the at least one second switch is operated in the second operation pattern when the third switch is on-off operated a second predetermined number of times and the fourth switch is then on-off operated a third predetermined number of times, during a second time period from a time of turning on the first switch.

* * * * *